May 18, 1965 A. L. M. A. ROUY 3,184,585
ILLUMINATING DEVICE
Filed May 7, 1962 2 Sheets-Sheet 1

INVENTOR
AUGUSTE L. M. A. ROUY
BY
ATTORNEY.

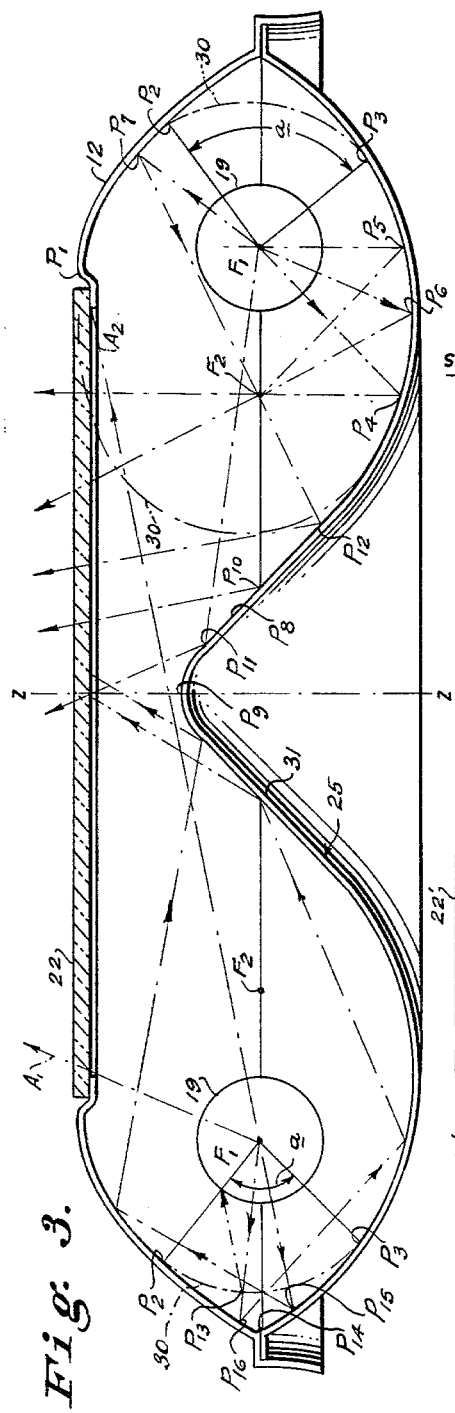
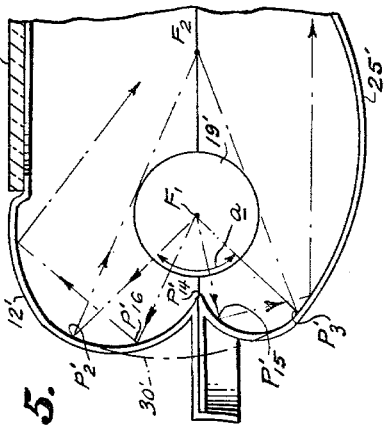
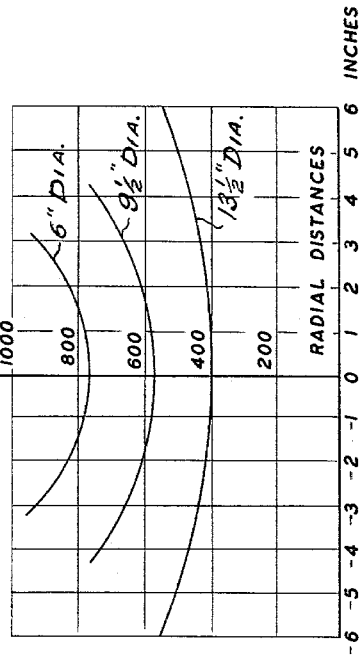
Fig. 3.
Fig. 5.
Fig. 6.
INVENTOR
AUGUSTE L. M. A. ROUY
BY
ATTORNEY.

United States Patent Office 3,184,585
Patented May 18, 1965

3,184,585
ILLUMINATING DEVICE
Auguste L. M. A. Rouy, Scarsdale, N.Y., assignor to The Ednalite Corporation, Peekskill, N.Y., a corporation of New York
Filed May 7, 1962, Ser. No. 192,674
6 Claims. (Cl. 240—2)

This invention relates generally to illuminating devices, and more particularly is directed to improvements in back illuminators, such as, light tables or panels.

Many transparent, semi-transparent or translucent objects must be examined with transmitted light, that is, against a brightly illuminated background, so as to permit observation of details or structures which escape detection when illuminated by incident light. For example, among the objects commonly examined against a brightly illuminated background are photographic negatives, X-rays films, biological tissue sections and recorder strip charts. Further, a source of transmitted light is required for photographing semi-transparent objects in order to obtain permanent records thereof, and also in the photo-enlarging or other reproduction of black and white or colored negatives.

In all of the above instances, the background or transmitted illumination must be homogeneous, that is, without dark spots, and of high intensity levels to permit comfortable visual examination of the object in a normally illuminated area, or to provide adequate intensity of illumination for photographic reproduction of the object.

Accordingly, it is an object of the invention to provide a device in the form of a light table or panel for illuminating transparent, semi-transparent or translucent objects placed thereagainst with transmitted light which is substantially homogeneous and of a high level of intensity.

Another object is to provide an illuminating device of the described character which is relatively simple and inexpensive in construction, and further is compact so as to permit the relatively widespread use of such illuminating device for all of the purpose indicated above.

It is well known that, when a uniformly illuminated object is photographed, the resulting photographic negative has a greater density at the center than at the periphery thereof by reason of the so-called "viganetism" of photographic objective lenses which act in accordance with the cosine to the fourth power law. A photographic negative of uniform density over its entire area can be obtained, for example, to permit direct densitometric measurements or analyses of the negatives as required in the control of bone diseases, only if the intensity of illumination of the object to be photographed is varied between the center and periphery thereof so as to compensate for the vignetism of the photographic objective lens.

Accordingly, it is a further object of the invention to provide an alluminating device of the described character which presents a field of transmitted illumination which varies in intensity between the center and periphery thereof in a manner to substantially fully compensate for the vignetism or cosine to the fourth power law governing photographic objectives.

A still further object is to provide an illuminating device of the described character which, when fitted with light polarizing filters, with or without quarter-wave plates, permits the visual examination, measurement and photographic recording of the strains and stresses in transparent or semi-transparent materials.

In accordance with an important aspect of this invention, an illuminating device of the described character comprises a housing having a circular opening in which a semi-transparent dispersing plate, for example, of opalescent glass, is supported to define a surface on which an object to be illuminated may be placed, an annular light source in the form of a circular fluorescent or other gas discharge tube disposed in the housing under or in back of the plane of the dispersing plate and centered with respect to the latter, and a reflector within the housing cooperating with the upper portion of the latter around the dispersing plate to define a reflecting surface of revolution having a generatrix the outer part of which is substantially the arc of an ellipse with the circular light tube at one focal point of the latter, while the inner part of the generatrix, which generates the central portion of the reflector, is a curved line of progressively increasing radii of curvature extending from the elliptical arc and terminating in a reverse curvature, so that the reflecting surface ensures that substantially all of the light emitted by the cricular light tube is directed against the light dispersing plate for obtaining the homogeneous illumination of the latter at a high level of intensity.

The above, and other objects, features and advantages of the invention, will be apparent in the following detailed description of an illustrative embodiment thereof which is to be read in connection with the accompanying drawings forming a part hereof, and wherein:

FIG. 3 is a diagrammatic view illustrating the operation of the device in obtaining a field of transmitted light which is homogeneous and of a high level of intensity;

FIG. 5 is a fragmentary diagrammatic view showing a modification of the arrangement illustrated in FIG. 3; and FIG. 6 is a graph showing the distribution of intensity of illumination with various devices embodying this n-venton.

Figure 1:
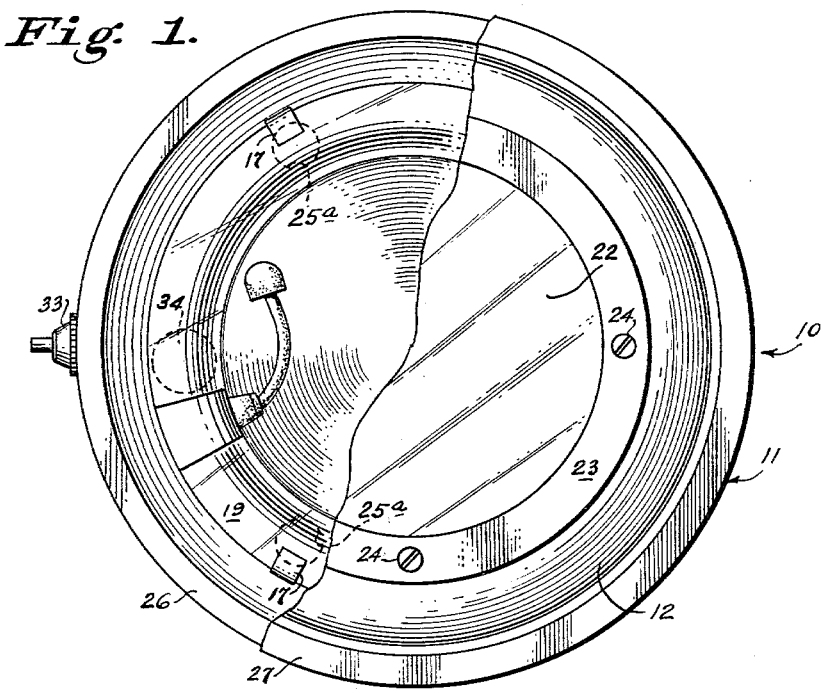
FIG. 1 is a top plan view of an illuminating device embodying this invention.
Figure 2:
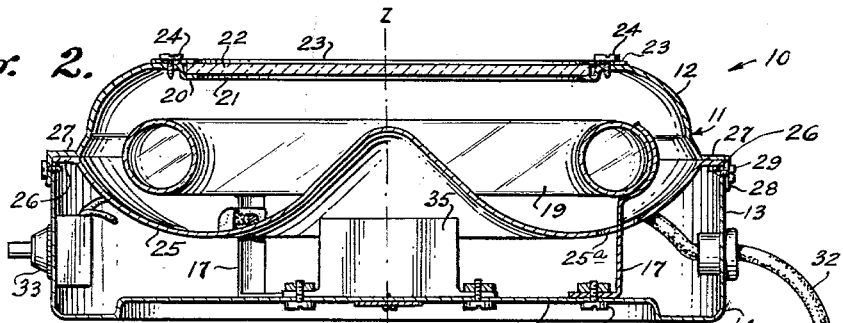
FIG. 2 is a transverse sectional view of the device taken along the line 2—2 on FIG. 1.

Referring to the drawings in detail, and initially to FIGS. 1 and 2 thereof, it will be seen that an illuminating device embodying the invention, and there generally identified by the reference numeral 10, includes a circular housing 11 of relatively small height which is made up of an annular upper portion 12 joined, at its outer periphery, to the edge of the upstanding marginal or side wall 13 of a lower housing portion 14. The lower housing portion 14 preferably has a bottom wall 15 which is recessed upwardly, as at 16 (FIG. 2), and to which upstanding spring clips 17 are suitably secured, as by screws and nuts 18, so as to support an annular light source 19, for example, in the form of a circular fluorescent or other gas discharge tube, with such light tube being centered with respect to the central axis Z—Z of the housing and lying substantially in the plane of separation of the upper and lower portions 12 and 14 of the latter.

The annular upper portion 12 of housing 11 is generally downwardly dished and its inner rim 20 is downwardly offset and defines a shoulder around the periphery of a circular opening 21 at the top of housing 11. Circular opening 21 is closed by a circular light dispersing plate 22 of opalescent glass or the like which rests, at its edge, on rim 20 and is held against the latter by a clamping ring 23 secured to housing upper portion 12 by screws 24.

It will be noted that circular opening 21 is centered with respect to circular light tube 19, and that the diameter of opening 21 is preferably slightly less than the inner diameter of circular light tube 19 so that, as shown on FIG. 3, all of the light rays which can impinge directly on dispersing plate 22 from light tube 19 within the angle included by the limiting rays $F_1$–$A_1$ and $F_1$–$A_2$ are at a substantial angle of incidence with respect to the plane of the dispersing plate. Thus, "hot spots" of excessively high intensity illumination are avoided at the periphery of dispersing plate 22 by reason of the shielding effect of the upper portion 12 of the housing which prevents the impingement of rays perpendicular to plate 22 directly from light tube 19.

Figure 4:
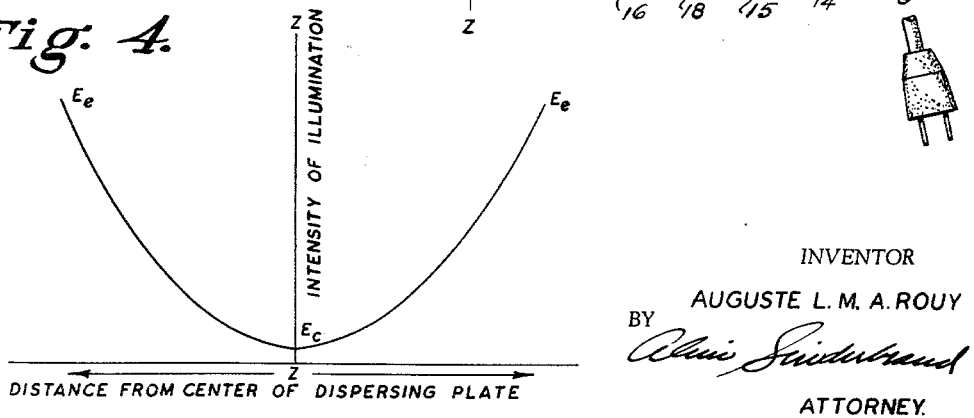
FIG. 4 is a graph showing the varied intensity of illumination that is obtained when an illuminating device does not include a reflecting surface embodying this invention.

With the structure so far described herein, that is, merely the housing 11 carrying the dispersing plate 22 and containing the circular light tube 19, the intensity of illumination of plate 22 would vary very substantially between the center and the periphery or edge, as indicated at $E_c$ and $E_e$, respectively, on FIG. 4. When viewed from above, the illuminated dispersing plate 22 would appear rather black at the center when compared with the illumination of the edge or peripheral portions, but even at the latter the intensity of illumination would be inadequate. With the simple arrangement described above, the variation of the intensity of illumination from the center to the edge of dispersing plate 22 could be reduced, thereby to obtain substantially homogeneous illumination, only by positioning the tube 19 at a distance from the plane of dispersing plate 22 which is several times greater than the diameter of plate 22. However, such a large distance between light tube 19 and dispersing plate 22 would undesirably increase the overall height of the device so that the latter would not be adaptable for widespread use. The relatively low level of the intensity of illumination obtained, even at the edge or periphery of plate 22, results from the fact that only a relatively small fraction of the light flux emitted by the circular light tube 19 impinges against the back of undersurface of dispersing plate 22, while the remainder of the emitted light is lost within the housing.

In accordance with the present invention, the dispersing plate 22 is illuminated substantially homogeneously and with a high level of intensity while maintaining a relatively small distance between the planes of circular light tube 19 and dispersing plate 22, and this objective is achieved by providing a reflecting surface within housing 11 having a particular configuration, as hereinafter described in detail.

A reflecting surface fulfilling the above requirements is generally in the form of a surface of revolution concentric with the central axis Z—Z of housing 11 and consisting of the inner surface of upper housing portion 12 and the upper surface of a circular reflector 25 disposed in housing 11 so that light tube 19 is located between upper housing portion 12 and reflector 25. The reflector may be supported in housing 11 by providing the circular periphery of reflector 25 with an outwardly directed flange 26 resting on the upper edge of side wall 13 and being held in position by an outwardly directed peripheral flange 27 formed on the outer periphery of upper portion 12 of the housing and having a depending rim 28 through which self tapping screws 29 extend into holes in side wall 13 for securing together housing portions 12 and 13 and reflector 25. Further, reflector 25 is formed with suitably spaced holes 25a through which spring clips 17 extend.

The reflecting surface of revolution generally makes use of the optical properties of an ellipsoid which theoretically forms, of an object placed at one of its focuses, an image at its conjugate focus equal to the object, with the total light flux emitted by the object being transferred onto the image with the exception of the reflection losses occurring at the reflecting surface.

More specifically, as shown in FIG. 3, the reflecting surface of revolution embodying this invention has a generatrix the outer part of which, extending between the points $P_1$ and $P_2$ on upper housing portion 12 and between the points $P_3$ and $P_4$ on reflector 25 (FIG. 3), is substantially the arc of an ellipse 30 having its major axis extending radially with respect to central axis Z—Z and further having focuses $F_1$ and $F_2$, with the light tube 19 being disposed at the focus $F_1$. Thus, light rays emitted by light tube 19 and impinging on the portion of the reflecting surface of revolution generated by such arc of an ellipse, as at the points $P_5$, $P_6$ and $P_7$, are reflected from the surface of revolution through the conjugate focus $F_2$ of the ellipse 30.

Further, it will be seen that the ellipse 30, of which the outer part of the generatrix is an arc, is spaced from the central axis Z—Z which is also the axis of revolution of the reflective surface.

The inner part of the generatrix of the reflecting surface of revolution beginning at the point $P_4$ at which the light ray $F_1$–$P_4$ emitted from light tube 19 is reflected back through the focus $F_2$ in the direction perpendicular to the plane of dispersing plate 22, which point $P_4$ is necessarily in line with the focus $F_2$, is constituted by an upwardly concave arcuate line $P_4$–$P_8$ extending tangentially from the ellipse 30 at the point $P_4$ and having progressively increasing radii of curvature to the point $P_8$ where it leads into a downwardly concave arcuate line $P_8$–$P_9$ of progressively decreasing radii of curvature. At the terminal point $P_9$ of the generatrix on the axis Z—Z, a tangent to the generatrix is substantially parallel to the plane of dispersing plate 22.

It will be seen that the inner part of the generatrix defined by the line $P_4$–$P_8$–$P_9$ defines a mound-like central portion 31 at the center of the reflector 25 with the point $P_9$ at the apex of such mound-like central portion being disposed immediately below the limiting light ray $F_1$–$A_2$ which extends from a point in light tube 19 and impinges on dispersing plate 22 at a point on the periphery of the latter which is diametrically opposed to such point in the circular light tube 19. Thus, the mound-like central portion 31 does not interfere with direct illumination of plate 22 by light rays from the light tube between the limiting rays $F_1$–$A_1$ and $F_1$–$A_2$.

It will be seen in FIG. 3 that light rays from tube 19 impinging against the outer part of reflector 25 between the points $P_3$ and $P_4$, for example, at the points $P_5$ and $P_6$, are reflected through focus $F_2$ in directions that converge toward central axis Z—Z, thereby to increase the intensity of illumination at the central area of plate 22.

By reason of the above described configuration of the mound-like central portion 31 of reflector 25, light rays from light tube 19 impinging directly against central portion 31, as at points $P_{10}$ and $P_{11}$, are also reflected toward dispersing plate 22 in directions that converge with respect to central axis Z—Z so that light rays emitted from the light tube below the limiting ray $F_1$–$A_2$, and which would otherwise be lost, are thus utilized for increasing the intensity of illumination at the central portion of dispersing plate 22. It will also be noted that light rays from light tube 19 which impinge against the outer portion of the reflecting surface of revolution defined by the upper housing portion 12, as at the point $P_7$, and which are reflected therefrom through the focus $F_2$ are further reflected from the central portion 31 of reflector 25, as at the point $P_{12}$, and thus also directed toward dispersing plate 22 along lines converging with respect to the central axis Z—Z.

In accordance with this invention, the outer part of the generatrix defining the reflecting surface of revolution of illuminating device 10 also departs from the true arc of the ellipse 30 which is represented by a broken line between the points $P_2$ and $P_3$ on FIG. 3. The points $P_2$ and $P_3$ represent the limiting locations on the arc of the ellipse 30 which subtend the angle $a$ containing those light rays from light tube 19 which, upon impinging against the reflecting surface, as at the point $P_{13}$, would be reflected back into the light tube so that light flux within the angle $a$ would not be available for illumination of dispersing plate 22. In order to avoid such loss of light flux from tube 19, the outer part of the generatrix between the points $P_2$ and $P_3$ is defined by lines which are tangent to ellipse 30 at such points and extend outwardly or inwardly with respect to the ellipse, for example, the lines $P_2$–$P_{14}$ and $P_3$–$P_{14}$. Such lines directed outside ellipse 30, as in FIG. 3, may be arcs of progressively increasing radii of curvature or straight lines, and are arranged so that light rays within the angle $a$ impinging against the related part of the reflecting surface of revolution, as at the points $P_{15}$ and $P_{16}$, are reflected therefrom along directions which clear the light tube 19. Thus, the light rays, which would otherwise be lost, undergo multiple reflections, as shown on FIG. 3, so as to finally impinge against the central portion of dispersing plate 22 for reinforcing the intensity of illumination at that area of the dispersing plate.

Although light flux from light tube 19 within the angle $a$ is recovered in the construction illustrated in FIG. 3 by modifying the generatrix of the reflecting surface of revolution between the points $P_2$ and $P_3$ along lines which deviate outwardly, that is, radially away from the central axis Z—Z from the arc of the ellipse 30, reference to FIG. 5 will show that the same result, that is, the recovery of the light flux which would otherwise be lost, can be achieved by deviating from the arc of the ellipse 30′ between the points $P'_2$ and $P'_3$ along lines $P'_2$–$P'_{14}$ and $P'_3$–$P'_{14}$ which depart radially inward from the arc of the ellipse. Such lines $P'_2$–$P'_{14}$ and $P'_3$–$P'_{14}$ may extend tangentially from the adjacent parts of the generatrix which are truly arcs of the ellipse 30′ and have progressively decreasing radii of curvature so as to form a cusp at the point $P'_{14}$. With the configuration of FIG. 5, light rays from light tube 19′ which impinge against the reflecting surface of revolution between the points $P'_2$ and $P'_3$, for example, at the points $P'_{15}$ and $P'_{16}$, are reflected along directions which clear light tube 19′ and undergo multiple reflections from the reflecting surface of revolution so as to be finally directed against the central portion of the dispersing plate 22′.

Although the configuration illustrated in FIG. 5 is feasible from an optical point of view, it will be apparent that the configuration previously described above with reference to FIG. 3 is preferred in that it greatly facilitates the manufacture of the upper portion 12 of the housing and of the reflector 25 by conventional stamping or molding procedures.

It will be apparent from the above description, particularly when considered in connection with FIGS. 3 and 5 of the drawing, that illuminating devices embodying the present invention make effective use of the entire light flux emitted by the light tube 19 or 19′, with the exception of the reflection losses, for illuminating the dispersing plate 22 or 22′. The reflection losses may be kept to a minimum by applying a high reflecting paint, for example, white titanium oxide paint, to the reflecting surface of revolution.

The illuminating device 10 is completed by a conventional electrical circuit for energizing the circular fluorescent light tube 19. Such circuit includes an insulated cable or cord 32 for connection to power supply lines, a suitable switch 33 preferably mounted in side wall 13, a starter 34 mounted on the bottom wall 16 of housing 11 and a ballast 35 which is conveniently mounted at the center of bottom wall 16 so as to be accommodated in the cavity or space created under the moundlike central portion 31 of reflector 25.

The major components of the illuminating device 10, namely the housing portions 12 and 14 and the reflector 25, may be conveniently and inexpensively stamped from metal or molded from suitably rigid plastic materials. Further, the reflector 25 is contained within housing 11 and thus protected by the latter from denting or other damage so that its critical contours are reliably maintained.

Tests have been conducted with several illuminating devices produced in accordance with the invention, which devices differ in the diameters of the dispersing plates 22 or 22′ thereof and of the circular fluorescent tubes employed as the light sources. The intensities of illumination obtained at the dispersing plates of such devices have been measured at different radial distances from the center of the dispersing plate, and the results of such measurements are indicated in the following table and further illustrated on FIG. 6 of the drawing for ready comparison with the distribution of intensity of illumination that is obtained in the absence of a reflecting surface embodying this invention, as shown on FIG. 4.

TABLE I

*Measured illuminations*

| Dispersing plate diameter | Fluorescent tube | | Emission average lumens | Illumination of plate at radial distance from center (foot candles) | | | | | | |
|---|---|---|---|---|---|---|---|---|---|---|
| | Diam., in. | Watts | | R-0 | 1″ | 2″ | 3″ | 4″ | 5″ | 6″ |
| 6″ | 8 | 22 | 710 | 760 | 780 | 830 | 915 | | | |
| 9½″ | 12 | 32 | 1,250 | 570 | 590 | 630 | 680 | 760 | | |
| 13½″ | 16 | 40 | 1,850 | 400 | 410 | 420 | 450 | 470 | 500 | 540 |

The above illuminations are considerable when considering that the translucent glass of the dispersing plate absorbs a rather large amount of lights, for example, more than 60%.

From FIG. 6 it is apparent that the measured intensities of illumination increase gradually from the center to the periphery or edge of the dispersing plate in each of the devices embodying the invention. This variation of the intensity of illumination is desirable in that it permits compensation for the cosine to the fourth power law of vignetism of photographic objective angular fields of view. However, the variations of illumination intensity across the dispersing plate remain well within the tolerable contrast acceptance of the human eye which yields subjective impressions proportional to the logarithm of the intensity ratio. Thus, although the intensity of illumination does, in fact, vary gradually across the dispersing plate in order to compensate for the vignetism of photographic objective lenses, such gradual variation is not so great that it can be subjectively perceived by the human eye.

The subjective noticeable contrast for the different illuminating devices previously referred to in Table I are as follows:

TABLE II

*Subjective illumination contrast*

| Dispersing plate diameter | Illumination (foot candles) | | Ratio | Ratio log | Contrast in decibels |
|---|---|---|---|---|---|
| | Center | Periphery | | | |
| 6″ | 760 | 915 | 1.204 | 0.08063 | 0.81 |
| 9½″ | 570 | 760 | 1.333 | 0.12483 | 1.25 |
| 13½″ | 400 | 540 | 1.350 | 0.13033 | 1.30 |

The above data must be compared against the logarithmic eye response whose range of perception without accommodation encompasses 30 decibels at any reference level with a limit of 0.086 decibel in resolving power under optimum condition.

As a matter of fact it is very difficult to observe any variation of the illumination intensity and this is logical since the elements of illuminated surface are not in close contact to permit the comparison. The eye resolving power of 0.086 decibels, corresponding to an intensity ratio of 1.02, is possible only when the two illuminated areas are brought in very close proximity to permit the appreciation of illumination differences.

The cosine to the fourth power law for the vignetism of photographic objectives may be given as:

$$E = E_o \cos^4 u \quad (1)$$

where

E is intensity of illumination of any point of the image
$E_o$ is the uniform intensity of illumination of the object, and
$u$ is the angular distance between the optical axis and the corresponding point on the object.

Thus, the brightness of the image decreases from the center to the periphery for uniform illumination of the object.

If the brightness of the image is to be maintained constant throughout the field, the illumination of the object must conform to the expression $$E_r = \frac{E_c}{\cos^4 u} \quad (2)$$

where $E_c$ is the intensity of illumination of the object at the optical axis, and
$E_r$ is the intensity of illumination at any point on the object at the angular distance $u$ from the optical axis.

Thus, the illumination of the object must increase from the center to the periphery thereof.

The performance of the illuminating device 10 in satisfying the condition of Equation 2 can be evaluated as follows:

Assuming that R is the distance in the object plane between the optical axis and any point on the object, that $u$ is the angular distance between such point on the object and the optical axis, and that $h$ is the distance along the optical axis between the object plane and the optical center of the photographic objective, then $$R = h \tan u \quad (3)$$

or $$\tan u = \frac{R}{h} \quad (4)$$

noting that $$\cos^2 u = \frac{1}{1 + \tan^2 u} \quad (5)$$

thus $$\cos^4 u = \frac{1}{(1 + \tan^2 u)^2} \quad (6)$$

The distances $h$ corresponding to the intensities of illumination measured for the various illuminating devices, as given in Table I, can be computed, as well as the deviations of such intensities of illumination from the exact requirements.

The distance $h$ corresponding to the measured intensities of illumination for the several devices is determined by means of $$\frac{E_r}{E_c} = \frac{1}{\cos^4 u} = (1 + \tan^2 u)^2 \quad (7)$$

yielding $$\tan^2 u = \sqrt{\frac{E_r}{E_c}} - 1 \quad (8)$$

or $$\tan u = \left[\sqrt{\frac{E_r}{E_c}} - 1\right]^{\frac{1}{2}} \quad (9)$$

and $$h = \frac{R}{\tan u} \quad (10)$$

Performing the computations for the three devices of Table I, the following is obtained:

TABLE III

*Distance of objective optical center to object*

| Plate diameter | Illumination ratio = $\frac{E_r}{E_c}$ | $\sqrt{\frac{E_r}{E_c}}$ | tan u | u | 2u | h |
|---|---|---|---|---|---|---|
| 6″ | 1.204 | 1.0972 | 0.3117 | 17°19′ | 34°38′ | 9.624″ |
| 9½″ | 1.333 | 1.1547 | 0.3933 | 21°28′ | 42°56′ | 10.17″ |
| 13½″ | 1.350 | 1.1619 | 0.4023 | 21°55′ | 43°50′ | 14.92″ |

It is immediately seen that both the distances $h$ of the objective optical center to the object and the corresponding angles of field of view $2\mu$ are very close indeed to the ones employed in photographic work of this nature for conventional photographic objectives.

The quality of the compensation for the cosine fourth power law for vignetism can be readily ascertained.

Considering first the 6 inches diameter illuminating device, the following data is obtained:

Diameter 6″—$h$=9.624″

| Radial distance R | 0″ | 1″ | 2″ | 3″ |
|---|---|---|---|---|
| Measured illumination (foot candles) | 760 | 780 | 830 | 915 |
| Ratio $E_r/E_c$ | 1.000 | 1.026 | 1.092 | 1.204 |
| tan u = R/h | 0.000 | 0.1039 | 0.2078 | 0.3117 |
| [1+tan² u]² | 1.000 | 1.022 | 1.088 | 1.204 |
| Difference | 0.000 | +0.004 | +0.004 | 0.000 |

It is seen that the compensation of the cosine to the fourth power of the vignetism law is obtained throughout the field at better than 0.4%. This is an exceedingly good result.

Considering the 9½ inches diameter illuminating device, the following is obtained:

Diameter 9½″—$h$=10.17″

| Radial distances R | 0″ | 1″ | 2″ | 3″ | 4″ |
|---|---|---|---|---|---|
| Measured illumination (foot candles) | 570 | 590 | 630 | 680 | 760 |
| Ratio $E_r/E_c$ | 1.000 | 1.035 | 1.105 | 1.193 | 1.3333 |
| tan u = R/h | 0/10.17 | 1/10.17 | 2/10.17 | 3/10.17 | 11/10.17 |
| [1+tan² u]² | 1.000 | 1.0194 | 1.0789 | 1.1816 | 1.3333 |
| Differences | 0.000 | +0.0156 | +0.0261 | 0.0114 | 0.0000 |

Here again the compensation is achieved to 2.61 percent maximum deviation. The determination for the 13½ diameter illuminating yields the following:

Diameter 13½″—$h=14.92$ inches

| Radial distances R | 0″ | 1″ | 2″ | 3″ | 4″ | 5″ | 6″ |
|---|---|---|---|---|---|---|---|
| Measured illumination (foot candles) | 400 | 410 | 420 | 450 | 470 | 500 | 540 |
| Ratio $E_r/E_c$ | 1.000 | 1.025 | 1.050 | 1.125 | 1.175 | 1.250 | 1.350 |
| tan u | 0/14.92 | 1/14.92 | 2/14.92 | 3/14.92 | 4/14.92 | 5/14.92 | 6/14.92 |
| $[1+\tan^2 u]^2$ | 1.000 | 1.009 | 1.0363 | 1.0824 | 1.1490 | 1.237 | 1.350 |
| Differences | 0.000 | +0.016 | +0.0137 | +0.0426 | +0.026 | +0.013 | +0.000 |

From the above, it will be obvious that the illuminating devices embodying the present invention compensate very closely for the vignetism of photographic objectives so that, when a transparent or semi-transparent object is photographed under transmitted illumination by such devices, the image has substantially uniform brightness. This feature of the invention is particularly important when the photographic negative is to be the subject of direct densitometric measurements, or when employing the devices as light sources in producing reproductions of color negatives.

Although illustrative embodiments of the invention have been described in detail herein with reference to the accompanying drawings, it is to be understood that the invention is not limited to those precise embodiments, and that various changes and modifications may be effected by one skilled in the art without departing from the scope or spirit of the invention, which is intended to be defined in the appended claims.

What is claimed is:
1. An illuminating device comprising
   A. a circular plate of translucent, light dispersing material,
   B. a circular light tube lying in a plane parallel to, and spaced from said plate and being concentric with the latter, and
   C. means defining a reflecting surface of revolution extending from the periphery of said circular plate and enveloping said light tube, said reflecting surface of revolution being defined by a generatrix revolved about an axis perpendicular to said plate at the center of the latter, said generatrix including
      (1) an outer part formed substantially as an arc of an ellipse having its major axis extending radially with respect to said axis with the radially outer focus of the ellipse located at said light tube, and
      (2) an inner part extending from said arc of an ellipse to said axis of revolution and formed substantially as a reversed curve, said inner part of the generatrix defining a mound-like central portion on said reflecting surface of revolution which is directed toward said plate
so that light rays emitted from said light tube in directions away from said plate are reflected by said surface so as to impinge on the plate and thereby effect homogeneous illumination of the plate with a high level of intensity.

2. An illuminating device as in claim 1;
   a. wherein said arc of an ellipse terminates at a point which lies on a line passing through the other focus of said ellipse normal to the plane of said plate, and
   b. wherein said reverse curve includes a portion of progressively increasing radii of curvature extending tangentially from said arc at said point and being concave in the direction toward said plate, and a portion which is convex in the direction toward said plate and has progressively decreasing radii of curvature so that rays of light impinging against mound-like central portions of the reflecting surface are reflected therefrom toward said plate in directions converging with respect to said axis of revolution thereby to fortify the intensity of illumination at the central portion of said plate.

3. An illuminating device as in claim 2;
   wherein said outer part of the generatrix deviates from said arc of the ellipse along convergent lines meeting at the central plane of said light tube so that light rays directed radially outward from the latter are reflected by the portion of said reflecting surface of revolution corresponding to said convergent lines of the generatrix along directions which by-pass said light tube and thus are available for illumination of said plate.

4. An illuminating device as in claim 3;
   wherein said convergent lines of the generatrix lie outside of said arc of the ellipse.

5. An illuminating device as in claim 3;
   wherein said convergent lines of the generatrix lie inside said arc of the ellipse.

6. An illuminating device comprising
   A. a generally circular housing having a centered circular opening at the top thereof,
   B. a plate of translucent, light dispersing material covering said opening,
   C. a circular light tube in said housing lying in a plane parallel to said plate and having an inner diameter which is at least as large as the diameter of said opening, and
   D. a reflector in said housing extending across the latter and cooperating with the upper portion of said housing to form a reflecting surface of revolution extending from the periphery of said plate and enveloping said light tube, said reflecting surface of revolution being defined by a generatrix revolved about an axis perpendicular to said plate at the center of the latter, said generatrix including
      (1) an outer part formed substantially as an arc of an ellipse having its major axis extending radially with respect to said axis with the radially outer focus of the ellipse located at said light tube, and
      (2) an inner part extending from said arc of an ellipse to said axis of revolution and formed substantially as a reversed curve, said inner part of the generatrix defining a mound-like central portion on said reflecting surface of revolution which is directed toward said plate
so that light rays emitted from said light tube in directions away from said plate are reflected by said surface so as to impinge on the plate and thereby effect homogeneous illumination of the plate with a high level of intensity.

References Cited by the Examiner
UNITED STATES PATENTS

| | | | |
|---|---|---|---|
| 2,216,993 | 10/40 | Von Wedel. | |
| 2,342,115 | 2/44 | Blauvelt | 88—24 X |
| 2,415,635 | 2/47 | Hopkins. | |
| 2,567,561 | 9/51 | Hoffmann | 240—11.4 X |
| 2,643,326 | 6/53 | Knapp | 240—2 |
| 2,878,372 | 3/59 | Fry | 250—51.12 |
| 2,923,812 | 2/60 | Hauptvogel | 240—11.4 X |

NORTON ANSHER, *Primary Examiner.*